United States Patent
Weiermayer et al.

(10) Patent No.: US 11,673,308 B2
(45) Date of Patent: Jun. 13, 2023

(54) WPC EXTRUSION PROFILE AND APPARATUS AND METHOD FOR MANUFACTURING THE SAME

(71) Applicant: GREINER EXTRUSION GROUP GMBH, Nussbach (AT)

(72) Inventors: Leopold Weiermayer, Wartberg/Krems (AT); Franz Zorn, Wartberg/Krems (AT)

(73) Assignee: GREINER EXTRUSION GROUP GMBH, Nussbach (AT)

( * ) Notice: Subject to any disclaimer, the term of this patent is extended or adjusted under 35 U.S.C. 154(b) by 223 days.

(21) Appl. No.: 16/966,890

(22) PCT Filed: Feb. 1, 2019

(86) PCT No.: PCT/EP2019/052512
§ 371 (c)(1),
(2) Date: Aug. 1, 2020

(87) PCT Pub. No.: WO2019/149892
PCT Pub. Date: Aug. 8, 2019

(65) Prior Publication Data
US 2021/0046688 A1    Feb. 18, 2021

(30) Foreign Application Priority Data
Feb. 1, 2018   (DE) .............. 10 2018 201 579.1

(51) Int. Cl.
*B29C 48/09*    (2019.01)
*B29C 48/00*    (2019.01)
(Continued)

(52) U.S. Cl.
CPC .......... *B29C 48/09* (2019.02); *B29C 48/0012* (2019.02); *B29C 44/355* (2013.01);
(Continued)

(58) Field of Classification Search
CPC ..... B29C 49/04; B29C 48/16; B29C 48/0021; B29C 48/0017; B29C 48/0015;
(Continued)

(56) References Cited

U.S. PATENT DOCUMENTS

| | | |
|---|---|---|
| 2002/0165289 A1 | 11/2002 | Park et al. |
| 2004/0142157 A1 | 7/2004 | Melkonian |

(Continued)

FOREIGN PATENT DOCUMENTS

| | | |
|---|---|---|
| CN | 105965846 A | 9/2016 |
| DE | 2602086 | * 12/2011 |

(Continued)

OTHER PUBLICATIONS

Mayer D., "Profile extrusion of/with thermoplastic elastomers," Polymer materials, pp. 26-31 (Jun. 2009).

(Continued)

*Primary Examiner* — Stella K Yi
(74) *Attorney, Agent, or Firm* — Maschoff Brennan

(57) ABSTRACT

It is provided a WPC extrusion profile comprising a WPC material, in which plant fibers are embedded in a plastic matrix, wherein the WPC material has a content of naturally growing plant fibers of between 30 and 75 wt-%, and the WPC extrusion profile includes at least one foam-filled hollow chamber. The at least one hollow chamber of the WPC extrusion profile is completely filled up with a foam, in particular a closed-pore foam. The foam includes or consists of a plastic material of the same type of plastic as the matrix of the WPC material. The foaming is effected by using a physically acting blowing agent, in particular $CO_2$, wherein the density of the foam is less than 0.4 g/cm$^3$ and the average cell size of the foam has a mean diameter of less than 0.4 mm.

15 Claims, 3 Drawing Sheets

(51) Int. Cl.
  *B29C 48/285* (2019.01)
  *B29C 44/34* (2006.01)
  *B29K 23/00* (2006.01)

(52) U.S. Cl.
  CPC ............... *B29C 48/2886* (2019.02); *B29C 2948/92704* (2019.02); *B29K 2023/06* (2013.01); *B29K 2023/12* (2013.01)

(58) Field of Classification Search
  CPC .............. B29C 48/0013; B29C 48/001; B29C 48/0012; B29C 48/09
  See application file for complete search history.

(56) References Cited

U.S. PATENT DOCUMENTS

2005/0067729 A1* 3/2005 Laver ............... B27N 3/28
  264/45.9
2006/0255488 A1 11/2006 Lin
2009/0181207 A1 7/2009 Michalik et al.

FOREIGN PATENT DOCUMENTS

| | | |
|---|---|---|
| EP | 1524385 | 4/2005 |
| EP | 2602086 A1 | 6/2013 |
| EP | 2641720 A1 | 9/2013 |
| JP | S51150579 A | 12/1976 |
| PL | 412386 A1 | 11/2016 |
| PL | 229683 B1 | 8/2018 |
| WO | 02103113 A2 | 12/2002 |

OTHER PUBLICATIONS

Van Lueck, F., "Foam Extrusion Technology—Today and Tomorrow," GAK, pp. 532-535 (Jun. 2015).
EA Office Action dated Jul. 22, 2022 as received in Application No. 202091843.

* cited by examiner

WPC EXTRUSION PROFILE AND APPARATUS AND METHOD FOR MANUFACTURING THE SAME

CROSS-REFERENCE TO A RELATED APPLICATION

This application is a National Phase Patent Application of International Patent Application Number PCT/EP2019/052512, filed on Feb. 1, 2019, which claims priority of German Patent Application Number 10 2018 201 579.1, filed on Feb. 1, 2018.

BACKGROUND

The disclosure relates to a WPC extrusion profile comprising at least one foam-filled hollow chamber, an apparatus for manufacturing the same and a method for manufacturing the same.

WPC extrusion profiles have been in use for over 20 years. WPC is a relatively young material and means Wood-Plastic-Compound. The term "wood" has a wide range of meanings and refers to many naturally growing plant fibers, not only wood but also hemp, palm and other fibers. These fibers are embedded in a plastic matrix, e.g. made of PVC, PP, PE, PET or PS. These plastics are also found in large quantities in household waste. Such "post-consumer plastics" can be used relatively easily as matrix plastics, since no very high demands are made on grade purity and low levels of impurities during further processing into WPC. Extrusion profiles are often made from WPC by extrusion. The main fields of use include e.g. decking boards, garden fence battens and posts and other applications, mostly for outdoor use.

A very important advantage of the composite material WPC is the increased stiffness (modulus of elasticity) due to the vegetable reinforcing fibers in the matrix. A further advantage is the high content of renewable raw materials, which very often amounts to 40 to 70 percent by weight, in some cases even up to 80 percent by weight. Disadvantages are the high density of the composite material, hence also the material costs, and the susceptibility to microbacterial decomposition. The density is comparatively high, higher than that of the two components plant fiber and the plastic as such, which has an impact on the price per running meter. Microbacterial decomposition is mainly based on a reaction of the plant fibers with water under environmental influences (mould, rotting, etc.).

One measure to reduce the extrusion profile costs is the design as a hollow WPC extrusion profile. The outer geometry is maintained and, with an expedient wall thickness, continues to contribute to a high stability under bending loads. The moment of inertia decreases only moderately because it is disproportionately (i.e. quadratically) influenced by the cross-sectional portions having a large distance to the neutral fiber. The cavities inside the profile, on the other hand, lead to a proportional reduction of the cross-section and thus of the profile costs and only moderately reduce the bending stiffness of the WPC extrusion profile. However, the hollow chambers lead to a further disadvantage: The surface of the WPC extrusion profile is approximately doubled. When the outer contour and hence the outer surface of the extrusion profile remains unchanged, additional surfaces are created at the boundary of the hollow chambers and possibly existing inner walls. In outdoor applications it is almost inevitable that water will penetrate into the cavities and accumulate. Water can get into the hollow chambers at the end faces, in the case of drilled holes or damages, also as condensation water etc. This water hardly dries up at all and inevitably leads to microbacterial decomposition.

A further measure to reduce the disadvantages mentioned, e.g. foaming of the WPC formulation, is hardly expedient.

The foaming of the composite WPC is limited to the plastics content only, e.g. 30%. In addition, the blowing agent is utilized only in part because the fibers "pierce" the bubbles produced during foaming, which results in a reduced foaming degree, irregular bubble distribution and considerable blowholes.

With regard to the modulus of elasticity, the same decreases disproportionately with increasing foaming degree, which leads to a strong loss of the desired advantage, the reinforcing effect.

In addition, foaming creates many pores and additional surfaces, so that water can easily penetrate through damaged pores into the depths similar to a sponge and therefore finds a large attack surface for microbacterial decomposition.

SUMMARY

The extrusion profiles according to the proposed solution above all will bring out the advantages of the WPC material (high modulus of elasticity, high content of renewable raw materials, etc.) and largely avoid the disadvantages mentioned (high weight per running meter and microbacterial decomposition, etc.).

This object is achieved by a WPC extrusion profile with features as described herein.

There is used a WPC material in which plant fibers are embedded in a plastic matrix. The WPC material has a content of naturally growing plant fibers between 30 and 75 wt-% and the matrix includes or consists of e.g. polyvinyl chloride, polyethylene, polypropylene, polyethylene terephthalate or polystyrene. Furthermore, the WPC extrusion profile has at least one foam-filled hollow chamber.

In this case, the at least one hollow chamber of the WPC extrusion profile is then completely filled with a foam, in particular a closed-pore foam, wherein the foam includes or consists of the same plastic material as the matrix of the WPC. The density of the foam is less than 0.4 g/cm$^3$ and the average cell size of the foam has a mean diameter of less than 0.4 mm Foam-filling the at least one cavity is effected by using a physically acting blowing agent, in particular $CO_2$.

Foam-filling the at least one cavity prevents liquid from penetrating without negatively changing the properties of the profile.

It is advantageous when the density of the foam is less than 0.3 g/cm$^3$ and the average cell size of the foam has a mean diameter of less than 0.3 mm.

Useful plant fibers include e.g. wood, hemp, palm fibers and/or straw.

To improve slip resistance, the WPC extrusion profile can have a structure, in particular a grooved structure, on at least one useful surface.

To ensure that the end faces of the WPC extrusion profile are single-colored when it is cut to length, the WPC component and the foam component are dyed in one embodiment and largely have the same color, so that the cut surfaces of the profile provide a homogeneous impression on visual inspection.

The object also is achieved by an extrusion apparatus with features as described herein. The extrusion apparatus includes a main extruder for the preparation of the WPC formulation. A co-extruder with a gassing device serves to prepare the foam formulation, which leads to a foaming process in at least one hollow chamber of the WPC extrusion profile, wherein the foam, in particular a closed-pore foam, has the same type of plastic as the matrix or consists of the same and the apparatus is equipped such that the density of the foam is less than 0.4 g/cm$^3$ and the average cell size of the foam has a mean diameter of less than 0.4 mm, and the gassing device (20) employs a physically acting blowing agent, in particular $CO_2$.

In one embodiment, the main extruder includes a twin-screw extruder and/or the coextruder includes a single-screw extruder for preparing the formulation for the foam.

The gassing device also can employ a physically acting blowing agent. In the gassing device as blowing agent for the foam, e.g. $CO_2$ in liquid form can be pressed into the plastic melt in the barrel area of the coextruder with a precisely defined gas flow, and the blowing agent can be finely distributed in the plastic mass due to the mixing effect resulting from the rotation of the screw.

A melt cooler can also be provided on the discharge side of the coextruder to reduce the melt temperature and, in particular, a static mixer can be provided downstream to largely unify the melt temperature.

In one embodiment, the two melt streams from the main extruder and the co-extruder are combined in a nozzle, wherein the nozzle is arranged in alignment with the main extruder and the co-extruder feeds laterally into this nozzle, and wherein in particular the flow channel for the WPC extrusion profile in the nozzle largely corresponds to that for normal hollow chamber profiles.

In one embodiment, a flow channel for the foam mass in the nozzle initially can penetrate that flow channel for the WPC mass without contact, and the flow channel then can expand in such a way that on the outlet side the cross-section of the flow channel amounts to about 25 to 50% of the cross-section of the hollow chamber.

The flow channel for the foam mass for example either can end flush with the end face of the nozzle or be joined with the flow channel for the WPC mass at about 3 to 20 mm in front of the end face of the nozzle.

The object also is achieved by an extrusion method with features as described herein.

In which
a) a WPC formulation is prepared by a main extruder and
b) a foam formulation is prepared in a co-extruder comprising a gassing device and is provided with a physically acting blowing agent, which leads to a foaming process in at least one hollow chamber of the WPC extrusion profile, wherein the foam includes the same type of plastic as the matrix of the WPC or consists of the same, and the method is arranged such that the density of the foam is less than 0.4 g/cm$^3$ and the average cell size of the foam has a mean diameter of less than 0.4 mm, and
c) the gassing device (20) employs a physically acting propellant, in particular $CO_2$.

BRIEF DESCRIPTION OF THE DRAWINGS

With reference to an exemplary composite profile, the manufacturing process and the extrusion line therefor will be described by means of the Figures.

DETAILED DESCRIPTION

Figure 1:
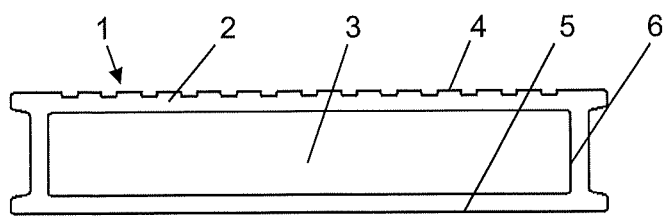
FIG. 1 shows an embodiment of a WPC extrusion profile with a foam-filled hollow chamber, concretely the cross-section of a decking board.

As WPC extrusion profiles 1 are very often used for the design of terraces, this solution is described using the example of a decking board and its fabrication in an extrusion process. However, the solution is not limited to terrace profiles 1, but is applicable to all WPC extrusion profiles 1 in which hollow chambers 6 are to be filled by a foam 3. It is assumed that WPC basically is well suited for the intended use, as is the case with decking boards.

The WPC extrusion profile 1 is mentally broken down into individual functional units, which as such can be optimized. In addition, the manufacturing process shall be optimized in terms of quality and manufacturing costs of the WPC extrusion profiles 1 by means of extrusion. With reference to a terrace profile 1, the typical functional features are shown and the aspects for their optimization are discussed:

Low cost per running meter: The main cost factor for WPC extrusion profiles 1 is the material costs. Small cross-sections of the WPC extrusion profile 1 and a low density of the material are to be aimed for. However, other properties of the WPC extrusion profile 1 that interact with each other must also be taken into account.

Stability against external loads: For terrace profiles 1, high rigidity against bending between the beams of the substructure is a main requirement. The main cross-section is rectangular. The same initially is designed as a hollow chamber profile. The wall thickness and possibly also the profile height can be varied within certain limits until the required bending stiffness is ensured theoretically.

Reduction of the surface area as a target for microbacterial degradation: In the embodiments described here, the cavity 6 is filled up by a rigid foam 3. The same is only made of plastic, namely the same plastic as the matrix of the WPC formulation and is not reinforced with vegetable fibers.

The vegetable fibers in the foam formulation would not contribute anything to the reinforcement, but on the other hand would hinder the foaming process. The foam 3 prevents water from penetrating into the hollow chambers 6. A closed cell structure is particularly advantageous so that the foam 3 cannot suck in water like a sponge. Moreover, in the case of foam-filled WPC extrusion profiles 1, no small creatures or insects etc. can penetrate into the cavities 6 and nest there.

The density of the foam 3 should be as low as possible, the cell structure fine-pored with a narrow distribution of the pore size. In principle, two foaming processes are possible, with chemically acting blowing agents or with physically acting blowing agents. The process with physically acting blowing agents is advantageous, because lower densities and a finer-pored cell structure can be achieved therewith. In addition, the formulation and preparation costs are lower with "physical foaming" as compared to "chemical foaming".

Even at low density, the compressive strength of foam 3 is high enough to dissipate forces acting on the upper surface of the decking board 1 (furniture, steps etc.) and to prevent the WPC wall from denting or breaking. The entire composite profile with WPC outer wall and pure plastic foam 3 in the cavity 6 has a very favorable ratio of bending stiffness to weight per meter per running meter or cost per running meter.

Color design of the foam 3: Expediently, the color should be the same as that of the surrounding WPC wall. As a result, laying can be similar to that of wooden or solid WPC boards. Visible end faces of the boards do not have to be closed by end caps. The WPC extrusion profiles 1 can be cut to any length, also diagonally or curved, and can also be trimmed in width. The cut surface is always neatly closed and the targeted functions are maintained.

Haptics of WPC extrusion profiles 1: The density of solid WPC profiles is usually greater than 1.0 g/cm$^3$. When handling such WPC extrusion profiles 1, even if the external impression corresponds to that of wooden profiles with the appropriate surface design, the difference in weight compared to wooden profiles is clearly noticeable. Despite a similar visual impression, the haptics are very different. When the average density of the WPC extrusion profile 1 is reduced to about 0.6 to 0.8 g/cm$^3$ due to the foam content, the feel is very similar to that of wooden profiles.

Design of the visible surfaces: In the case of decking boards 1, wood-like, rather coarse surface structures are common, which distinctly reduce the risk of slipping. Often a grooved structure is extruded and the surface is subsequently finished by sanding, brushing or milling so that the surface is matt and has a typical structure very similar to that of wooden profiles. A different grooved structure on the two main surfaces of boards, produced by extrusion, is described in patent specification EP 1 524 385 B1. In one embodiment, one visible surface can be extruded with a grooved structure and the other one flat. The grooved structure corresponds to the one with the highest sales volume, the flat surface can be adapted to any customer requirements by mechanical finishing in-line during extrusion. This mechanical finishing can also be carried out off-line on the profile rods already cut to length, wherein small batch sizes can also be taken into account. In addition to a modified grooved structure, a "grain" typical for wood can also be reproduced by a milling operation. This finishing is economical even for comparatively small sales volumes.

The above mentioned mechanical finishing of the visible surfaces also has a disadvantage. The surface largely closed by the extrusion process—because a thin plastic film almost always covers the wood particles—leads to a rather small attack surface of the plant fibers for water. As a result of finishing, plastic layers are removed and much more plant fibers lie directly on the surface and thus can react with the water under outdoor weathering conditions. It is therefore advantageous when only that visible surface which actually forms the tread surface is mechanically finished and all other external surfaces of the profile retain the closed surface originally formed during extrusion.

For particularly durable WPC extrusion profiles 1, co-extrusion with a thin layer of non-reinforced plastic is recommended. This layer likewise is freely designable in terms of color and fine structure and prevents direct contact between the wood particles and the environment. In this case, the WPC in the profile 1 serves only as a reinforcing component. The outer surface of compact plastic and the foam core in the hollow chambers protect the wood particles against microbacterial decomposition.

FIG. 1 shows an embodiment of a WPC extrusion profile 1, illustrated with reference to a decking board.

The outer wall 2 of the WPC extrusion profile 1 is made of WPC and, for stability reasons, usually has a wall thickness greater than approx. 4 mm for boards 1.

In the WPC extrusion profiles 1, wood particles are used, ground to defined degrees of fineness from fine to coarse, but also fibers from other plants, such as hemp, palm or straw. Common plastics are used as matrix, often PVC or polyolefins (polyethylene, polypropylene).

Fiber contents of between 30 and 75 percent by weight are used in the material in question because, on the one hand, a noticeable reinforcement is achieved and, on the other hand, there is still sufficient plastic available to properly coat the individual fiber particles and to bond them together.

The hollow chamber 6 of the WPC extrusion profile 1 is completely filled with foam. This foam 3 is formed from the same type of plastic that serves as a matrix in the WPC formulation. When e.g. polypropylene is used in the WPC formulation, polypropylene is also used for foam-filling the hollow chamber. This ensures that the foam and the WPC outer wall are welded together and firmly connected to each other.

The illustrated embodiment of the decking board 1 has two differently designed usable surfaces.

In the embodiment as shown in FIG. 1, the upper usable surface 4 of the WPC extrusion profile 1 has a grooved structure, whereas the lower usable surface 5 has a flat surface. This allows a high flexibility in surface design. The upper usable surface 4 has that grooved structure which is most frequently requested and therefore is expediently shaped during extrusion.

The lower usable surface 5 initially is designed flat and can be converted both into a grooved structure and into other structures by mechanical machining operations.

By brushing, grinding, milling or hot embossing both surfaces 4, 5 can yet be finished, e.g. to increase the slip resistance or to produce a more wood-like appearance. In the lower usable surface 5, a very wide scope for design remains, because the surface treatment according to the above-mentioned methods can be carried out both on-line and off-line, even after an extended intermediate storage.

Figure 2:
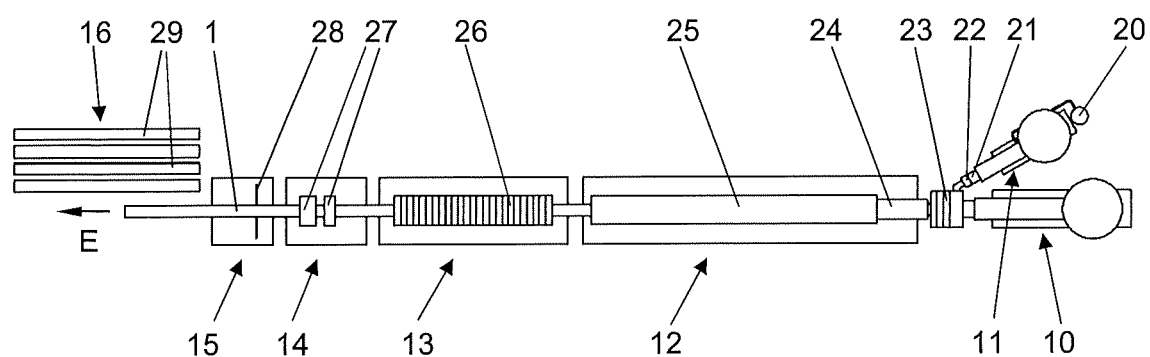
FIG. 2 shows a schematic representation of an extrusion line for the extrusion of a WPC extrusion profile with a foam-filled hollow chamber by using the foaming technology with a physically acting blowing agent.

FIG. 2 schematically shows an embodiment of an extrusion line for manufacturing foam-filled WPC extrusion profiles 1, here using the example of a decking board. The description of the extrusion process follows the material flow in extrusion direction E, i.e. it starts with the extruders and ends with the profiles cut to length, in FIG. 2 from right to left.

The main extruder 10 is a twin-screw extruder with counter-rotating screws, which can be configured both conical and parallel. This main extruder 10 is used to prepare the WPC formulation. The special advantages of this extruder with regard to the processing of WPC extrusion profiles 1 include: high build-up of pressure, forced feed, good mixing effect and "self-cleaning screws".

A co-extruder 11 is provided for preparing the foam formulation. Said co-extruder is preferably arranged at an angle to the main extruder 10 so that the melt is introduced into a nozzle 23 of the extrusion apparatus at an angle of about 30°. As a result, the entire extrusion line requires only a comparatively small amount of space in terms of width.

The co-extruder 11 is a single-screw extruder comprising a gassing device 20. It serves to prepare the foam formulation. The gassing device 20 comprises a gas reservoir and a high-pressure pump. The gas in liquid form is pressed into the plastic melt by the gas supply in the cylinder with a precisely defined gas flow and causes a physically activated foaming of the plastic melt after leaving the nozzle 23. The gas is finely distributed in the melt by the rotating screw due to a mixing effect. After the decrease of the melt pressure at the outlet of the nozzle, the gas foams up and leads to the foam 3 of the plastic material. Physically activated foaming above all has the following advantages as compared to chemically activated foaming: The cost of the formulation, including that of the gas and the process for incorporating the same into the melt, is about 5% lower than for the process with chemically activated foam. Lower densities can be achieved and the pore size is finer and more closely distributed. Foam densities of around 0.4 g/cm$^3$ can easily be achieved with polyolefins. With an optimized process control, the single-screw co-extruder used permits densities of less than 0.3 g/cm$^3$. This also means that the manufacturing costs of the WPC extrusion profiles with physically activated foam are lower than those with chemically activated foam and the foam quality is better.

The foam structure of foam 3 is improved in terms of pore size distribution and the occurrence of blowholes with increasing intensity of the mixing effect in the extruder. Intensive mixing is accompanied by an increase in the melt temperature, the heat content of the melt increases. As this heat is difficult to dissipate to the outside during the profile calibration process due to the foam structure, it is expedient to already cool down the melt slightly. In addition, a comparatively low melt temperature is conducive to a uniform foam structure with regard to a small pore size and its distribution. A melt cooler 21 therefor is provided downstream of the co-extruder and upstream of the nozzle 23. Here, the melt is guided through several parallel flow channels so that it has contact with a comparatively large wall surface, which is tempered with a cooling liquid via bores. This melt cooler 21 allows a decrease of the melt temperature by up to 30° C. As, among other things, a uniform melt temperature is a prerequisite for uniform foaming, the melt also passes through a static mixer 22 after the melt cooler 21, which results in a largely even temperature profile.

The described material preparation of the foam formulation by means of a single-screw extruder 11 and the metered addition of a physical blowing agent by means of a high-pressure pump is less expensive than the foaming process with chemical blowing agents and at the same time leads to a better foam quality.

The two melt streams from main extruder 10 and co-extruder 11 are combined in the nozzle 23. The nozzle 23 is aligned with the main extruder 10, and the co-extruder 11 delivers the foam mass laterally into this nozzle 23 at an angle. A calibration table 12 is arranged in alignment with the main extruder 10. On this calibration table the calibration unit is mounted, which is supplied with cooling water and negative pressure. The calibration unit consists of a dry calibration device 24 and a wet calibration device 25. The calibration table 12 is traversable in longitudinal direction so that the dry calibration device 24 adjoins the nozzle 23 at a distance of about 1 to 10 mm.

In the dry calibration device 24, the WPC extrusion profile 1 is sucked against the calibrator wall with negative pressure and thereby is cooled, wherein only the outer layers will freeze initially. This is where chiefly the outer contour and its surface quality of the WPC extrusion profile 1 are determined.

In the wet calibration device 25, the WPC extrusion profile furthermore is supported at larger intervals by means of screens or rollers and is cooled down further by direct exposure to cooling water.

In the caterpillar take-off unit 13, the largely cooled WPC extrusion profile 1 is clamped between two caterpillars 26 and withdrawn in extrusion direction E.

In a surface treatment unit 14, the visible surfaces of the WPC extrusion profile 1 are mechanically treated by machining units 27 for brushing, grinding or milling. This surface treatment unit 14 can also be arranged upstream of the caterpillar take-off unit 13, relative to the extrusion direction E. By grinding, milling and/or brushing, a wood-like surface is produced by removing the outer, more or less glossy layer of the profile, which is largely formed from the matrix plastic, so that many plant fibers lie directly on the surface.

By milling, longitudinal grooves can be produced in the initially flat, lower usable surface 5, which differ in terms of shape (width, depth) and separation from the grooves of the upper usable surface 4. Such boards then have two different usable surfaces, which increases the design possibilities when laying the decking boards 1.

Instead of pure longitudinal grooves, wood-like grains can also be milled or brushed into the initially flat, lower usable surface 5 when the width and depth positions of several narrow brushing or milling discs are actuated correspondingly in relation to the linearly passing profile 1.

By means of a cutting unit 15, the WPC extrusion profile 1 is cut to length by using a saw blade 28. The individual profile bars or strips 29 are then temporarily stored on a cross conveyor 16, where they cool down further in an air stream. As soon as the mean temperature reliably lies below about 40° C., the profiles can be placed in containers and taken to a storage facility.

Figure 3:
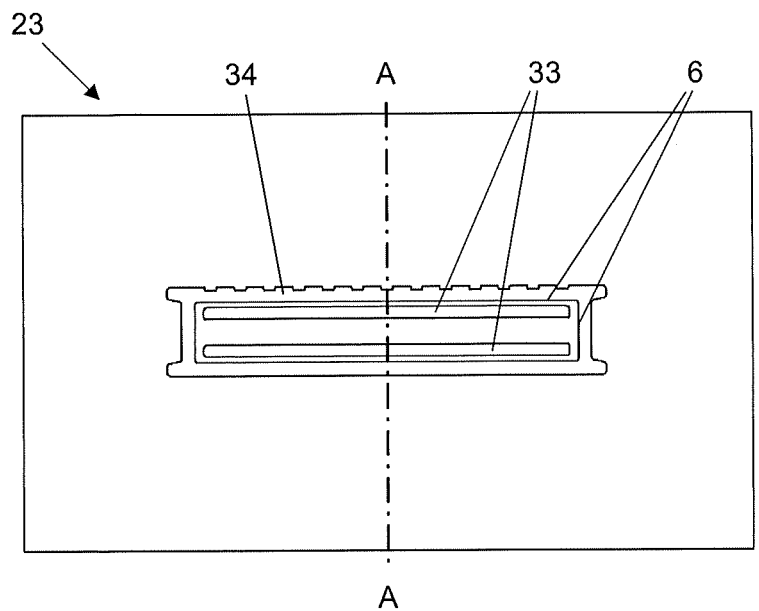
FIG. 3 shows a front view of the nozzle 23 against the direction of extrusion for an embodiment of the flow channel routing for the foam component.

FIG. 3 shows a front view of the nozzle 23 against the direction of extrusion for an embodiment of the flow channel routing for the foam component. The WPC leaves the nozzle through the outlet gap 34, the foam through two outlet gaps 33. The initially still compact melt for the foam begins to foam up immediately after the decrease of the melt pressure at the end of the nozzle, so that after a short distance from the nozzle (about 10 to 50 mm), the hollow chamber 6 is filled up completely.

Figure 4:
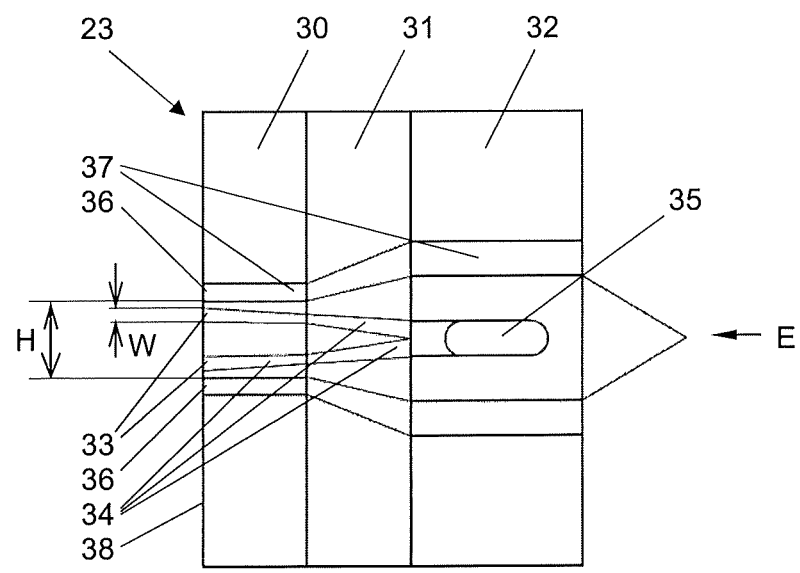
FIG. 4 shows a sectional view of the nozzle 23, in FIG. 3 designated by the section A-A.

FIG. 4 shows a sectional view of the nozzle 23, in FIG. 3 marked by section A-A; only the outlet-side part of the nozzle consisting of the nozzle plates 30 to 32 is shown. The flow channel 37 for the WPC in the nozzle 23 largely corresponds to that for normal WPC hollow chamber profiles and leads into the atmosphere through the outlet gap 36 at the nozzle end face 38. The feed channel 35 for the foam mass first penetrates the flow channel 37 for the WPC in a "contact-free" manner and then passes into the flow channel 34 for the foam mass. The latter is divided into two channels which likewise open through two outlet gaps 33 at the nozzle end face in the nozzle core region for the cavity 6. The height H of the cavity serves to dimension the gap width W for the two outlet gaps 33: The flow velocity of the compact foam mass in the outlet gap should be approximately the same as the take-off velocity of the profile. This means that the increase in volume during foaming is effected only in the radial direction. When the density of the foam decreases during foaming, e.g. to ⅓ of the density of the compact foam mass, the sum of the two outlet gaps 33 likewise should be only ⅓ of the cross-section of the hollow chamber. With the size ratios indicated in FIG. 4, this is expressed in the following formula with good approximation: W=H/6.

Both flow channels usually lead into the open air at the end of the nozzle, on the end face of the nozzle 23. However, it is also expedient to combine the two flow channels shortly before the nozzle end, about 5 to 20 mm in front of the end face, as is illustrated by the two FIGS. 5 and 6.

Figure 5:
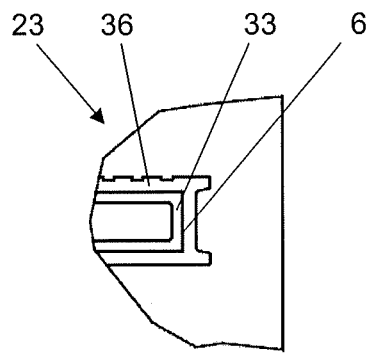
FIG. 5 shows a section from the front view of the nozzle 23 against the direction of extrusion for another embodiment of the flow channel routing for the foam component.

FIG. 5 shows a section from the front view of the nozzle 23 against the direction of extrusion for another embodiment of the flow channel routing for the foam component. The outlet gaps 33 and 36 for the foam mass and for the WPC, respectively, form a common gap in the outlet region, about 3 to 20 mm in front of the end face 38 of the nozzle. This can be seen better in FIG. 6.

Figure 6:
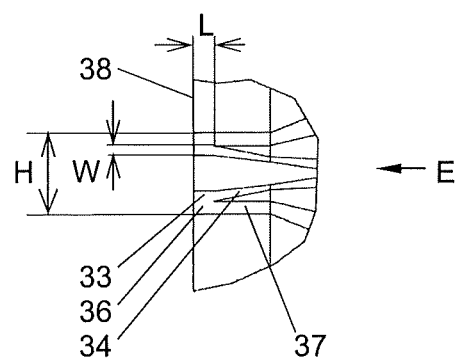
FIG. 6 shows a section from the sectional view of the nozzle 23, in FIG. 3 designated by the section A-A, for the flow channel routing as shown in FIG. 5.

FIG. 6 shows a section from the sectional view of the nozzle 23 for the flow channel routing as shown in FIG. 5. In the example shown, the flow channels 34 and 37 for the foam mass and the WPC are combined in front of the end face of the nozzle. In the concrete example, the dimension L is approx. 8 mm, so that the two outlet gaps 33 and 36 form a common flow channel and the two melt streams have direct contact with each other. As a result, the two materials unite at a higher pressure, about 5 to 40 bar depending on the gap width and length in this common flow channel, which leads to a particularly good adhesion between the WPC outer wall and the internal foam component. The outer surface of the WPC extrusion profile 1 thereby becomes particularly smooth, crack- and pore-free, especially when (approx. 10 to 30 mm before the nozzle end) the outer flow channel wall in the outlet region is cooled by a cooling medium, which however is not explained here in detail.

Figure 7:
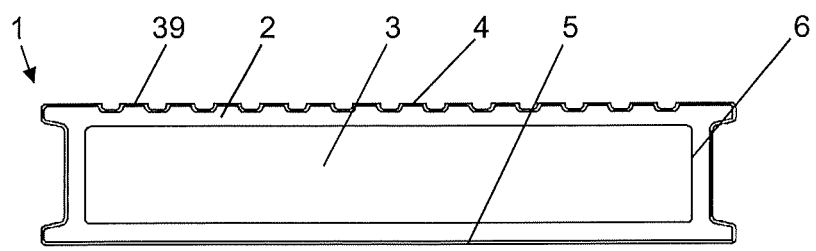
FIG. 7 shows another embodiment of a WPC extrusion profile with a foam-filled hollow chamber, with an external coating of non-reinforced plastic material.

FIG. 7 shows another embodiment of a WPC extrusion profile comprising a foam-filled hollow chamber. Here, the outer surface of the profile is provided with a coating 39 of non-reinforced plastic material of the same type as the WPC matrix, either all around the entire profile or only in certain regions, e.g. only on the two usable surfaces. This coating prevents the direct contact of the wood particles or other natural fibers with the surroundings. These particles are therefore not directly exposed to environmental influences, which clearly counteracts microbacterial decomposition. An additional co-extruder is required for the application of this coating. However, the necessary expansion of the extrusion line and the method will not be discussed here in detail.

LIST OF REFERENCE NUMERALS

1 WPC extrusion profile, decking board
2 external wall
3 foam that fills the hollow chamber
4 upper usable surface, with grooved structure
5 lower usable surface, flat
6 contour of the hollow chamber
10 main extruder
11 co-extruder with gassing device
12 calibration table
13 caterpillar take-off unit
14 surface treatment unit
15 separation unit
16 cross-conveyor
20 gassing device
21 melt cooler
22 static mixer
23 nozzle
24 dry calibration device
25 wet calibration device
26 caterpillars
27 machining units
28 saw blade
29 profile bars or strips cut to length
30 1st nozzle plate
31 2nd nozzle plate
32 3rd nozzle plate
33 outlet gap for the foam mass
34 flow channel for the foam mass
35 feed channel for the foam mass
36 outlet gap for the WPC formulation
37 flow channel for the WPC
38 end face of the nozzle
39 coating of non-reinforced plastic material
E extrusion direction

The invention claimed is:

1. A WPC extrusion profile comprising:
a WPC material in which plant fibers are embedded in a plastic matrix, wherein:
the WPC material has a content of naturally growing plant fibers of between 30 and 75 wt-%
the WPC extrusion profile includes at least one hollow chamber,
the at least one hollow chamber of the WPC extrusion profile is completely filled up with a foam, in particular a closed-pore foam
the foam consists of a plastic material of the same type of plastic as the matrix of the WPC material,
foaming takes place with a physically acting blowing agent, in particular $CO_2$,
the density of the foam is less than 0.4 g/cm3, and
the average cell size of the foam has a mean diameter of less than 0.4 mm.

2. The WPC extrusion profile according to claim 1, wherein the plastic matrix has a content of polypropylene, polyethylene and/or polyethylene terephthalate or consists of these materials.

3. The WPC extrusion profile according to claim 1, wherein the density of the foam is less than 0.3 g/cm$^3$ and the average cell size of the foam has a mean diameter of less than 0.3 mm.

4. The WPC extrusion profile according to claim 1, wherein the plant fibers include wood, hemp, palm fibres and/or straw.

5. The WPC extrusion profile according to claim 1, wherein at least one usable surface has a structure, in particular a grooved structure.

6. The WPC extrusion profile according to claim 1, wherein the WPC material and the foam are dyed and largely have the same color, so that cut surfaces of the WPC extrusion profile provide a homogeneous impression on visual inspection.

7. An extrusion apparatus for manufacturing a WPC extrusion profile comprising a WPC material, in which plant fibers are embedded in a plastic matrix, at least according to claim 1, wherein:

a main extruder is used for preparing the WPC formulation and a co-extruder comprising a gassing device is used for preparing the foam mass, which leads to a foaming process using a physically acting blowing agent in at least one hollow chamber of the WPC extrusion profile, wherein the foam consists of the same type of plastic material as the matrix, the apparatus is equipped such that the density of the foam is less than 0.4 g/cm$^3$, the average cell size of the foam has a mean diameter of less than 0.4 mm, and the gassing device employs a physically acting blowing agent, in particular $CO_2$, wherein, in a nozzle of the extrusion apparatus, a feed channel for the foam mass initially penetrates a flow channel for the WPC in a contact-free manner and then passes into a flow channel for the foam mass, wherein, on an outlet side, a cross-section of the flow channel for the foam mass in the nozzle amounts to 25 to 50% of a cross-section of the hollow chamber.

8. The extrusion apparatus according to claim 7, wherein the main extruder includes a twin-screw extruder and/or the co-extruder includes a single-screw extruder for the preparation of the foam mass.

9. The extrusion apparatus according to claim 8, wherein:
in the gassing device CO2 in liquid form as a blowing agent for the foam can be pressed into the plastic melt with a precisely defined gas flow in the barrel area of the coextruder, and the blowing agent can be finely distributed in the plastic mass due to the mixing effect resulting from the rotation of the screw.

10. The extrusion apparatus according to claim 7, wherein on the discharge side of the coextruder a melt cooler for reducing the melt temperature and, in particular, subsequently a static mixer for largely unifying the melt temperature are provided.

11. The extrusion apparatus according to claim 7, wherein:
the two melt streams from the main extruder and the co-extruder are combined in a nozzle, wherein the nozzle is arranged in alignment with the main extruder and the co-extruder feeds laterally into this nozzle, and in the nozzle in particular the flow channel for the WPC extrusion profile largely corresponds to that for normal hollow chamber profiles.

12. The extrusion apparatus according to claim 7, wherein:
the flow channel for the foam mass adjoins the feed channel and subsequently widens in such a way that the cross-section of an outlet gap for the foam mass is about 25 to 50% of the cross-section of the hollow chamber.

13. The extrusion apparatus according to claim 7, wherein:
the flow channel for the foam mass either opens out flush with the end face of the nozzle or is merged with the flow channel for the WPC mass at about 3 to 20 mm in front of the end face of the nozzle.

14. An extrusion method for manufacturing WPC extrusion profiles according to claim 1, wherein:
a) the WPC formulation is prepared by a main extruder and extruded at a take-off velocity forming a WPC extrusion profile having at least one hollow chamber,
b) a co-extruder comprising a gassing device is used for preparing the foam mass, which leads to a foaming process using a physically acting blowing agent in the at least one hollow chamber of the WPC extrusion profile, wherein the foam consists of the same type of plastic material as the matrix of the WPC formulation, and the method is equipped such that the density of the foam is less than 0.4 g/cm$^3$ and the average cell size of the foam has a mean diameter of less than 0.4 mm,
c) the gassing device employs a physically acting blowing agent, in particular $CO_2$ and
d) the foam mass flows through an outlet gap into the at least one hollow chamber at a flow velocity which is the same as the take-off velocity.

15. The extrusion apparatus according to claim 7, wherein a sum of cross-sections of two outlet gaps of the flow channel is ⅓ of the cross-section of the hollow chamber.

* * * * *